(12) United States Patent
Lim et al.

(10) Patent No.: US 9,111,359 B2
(45) Date of Patent: Aug. 18, 2015

(54) METHOD AND SYSTEM FOR DETECTING MATRIX-BASED MOTION INCLUDING FREQUENCY TRANSFORM AND FILTERING

(71) Applicants:Samsung Techwin Co., Ltd., Changwon (KR); Korea Advanced Institute of Science and Technology, Daejeon (KR)

(72) Inventors: Jeong-eun Lim, Changwon (KR); Seung-in Noh, Changwon (KR); Ha-na Hong, Changwon (KR); In-so Kweon, Daejeon (KR); Tae-hyun Oh, Daejeon (KR)

(73) Assignees: SAMSUNG TECHWIN CO., LTD., Changwon (KR); KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 218 days.

(21) Appl. No.: 13/760,578

(22) Filed: Feb. 6, 2013

(65) Prior Publication Data
US 2013/0294655 A1 Nov. 7, 2013

(30) Foreign Application Priority Data
May 7, 2012 (KR) .................. 10-2012-0048314

(51) Int. Cl.
*G06T 7/20* (2006.01)
*G06F 17/16* (2006.01)
*G06T 3/00* (2006.01)

(52) U.S. Cl.
CPC . *G06T 7/20* (2013.01); *G06T 7/206* (2013.01); *G06F 17/16* (2013.01); *G06T 3/0087* (2013.01)

(58) Field of Classification Search
CPC ......... G06T 7/20; G06T 7/206; G06T 3/0087; G06F 17/16; G06F 17/56
USPC .......................... 382/107, 103, 276, 280, 294
See application file for complete search history.

(56) References Cited

U.S. PATENT DOCUMENTS

| | | | |
|---|---|---|---|
| 5,982,432 A | 11/1999 | Uenoyama et al. | |
| 7,764,841 B2 | 7/2010 | Lee et al. | |

(Continued)

FOREIGN PATENT DOCUMENTS

| | | | |
|---|---|---|---|
| JP | 4526529 B2 | 6/2010 | |
| KR | 1020040072912 A | 8/2004 | |

(Continued)

OTHER PUBLICATIONS

Collins, Toby. "Analysing Video Sequences Using the Spatio-temporal Volume." (2004): 1-28. Print.*

(Continued)

*Primary Examiner* — Michael A Newman
(74) *Attorney, Agent, or Firm* — Sughrue Mion, PLLC

(57) ABSTRACT

A method and system for detecting motion are provided. The method includes: generating a time domain matrix including vectors corresponding to variation of pixel values as elements of the time domain matrix, of a video image including a plurality of frames; generating a motion matrix from which a low frequency area of the video image is removed by multiplying the time domain matrix by a low rank matrix; and generating a result image including a plurality of frames in which vectors, which are elements of the motion matrix, are included as variation of motion pixel values.

24 Claims, 9 Drawing Sheets
(2 of 9 Drawing Sheet(s) Filed in Color)

(56) References Cited

U.S. PATENT DOCUMENTS

| | | | |
|---|---|---|---|
| 8,855,213 B2* | 10/2014 | Filippini et al. | 375/240.29 |
| 2007/0104382 A1* | 5/2007 | Jasinschi | 382/254 |
| 2010/0201871 A1* | 8/2010 | Zhang et al. | 348/465 |
| 2010/0316257 A1* | 12/2010 | Xu et al. | 382/103 |
| 2012/0207353 A1* | 8/2012 | Zhao et al. | 382/103 |
| 2012/0219174 A1* | 8/2012 | Wu | 382/103 |

FOREIGN PATENT DOCUMENTS

| | | |
|---|---|---|
| KR | 1020050063908 A | 6/2005 |
| KR | 100723411 B1 | 5/2007 |

OTHER PUBLICATIONS

Heeger, David. "Optical Flow Using Spatiotemporal Filters." International Journal of Computer Vision (1988): 279-302. Print.*

Guyon, Et Al. "Foreground Detection via Robust Low Rank Matrix Decomposition including Spatio-temporal Constraint." Computer Vision—ACCV 2012 Workshops LCNS 7728 (2012): 315-20. Print.*

Basharat, Et Al. "Content Based Video Matching Using Spatiotemporal Volumes." Computer Vision and Image Understanding 110 (2008): 360-77. Print.*

* cited by examiner

FIG. 6
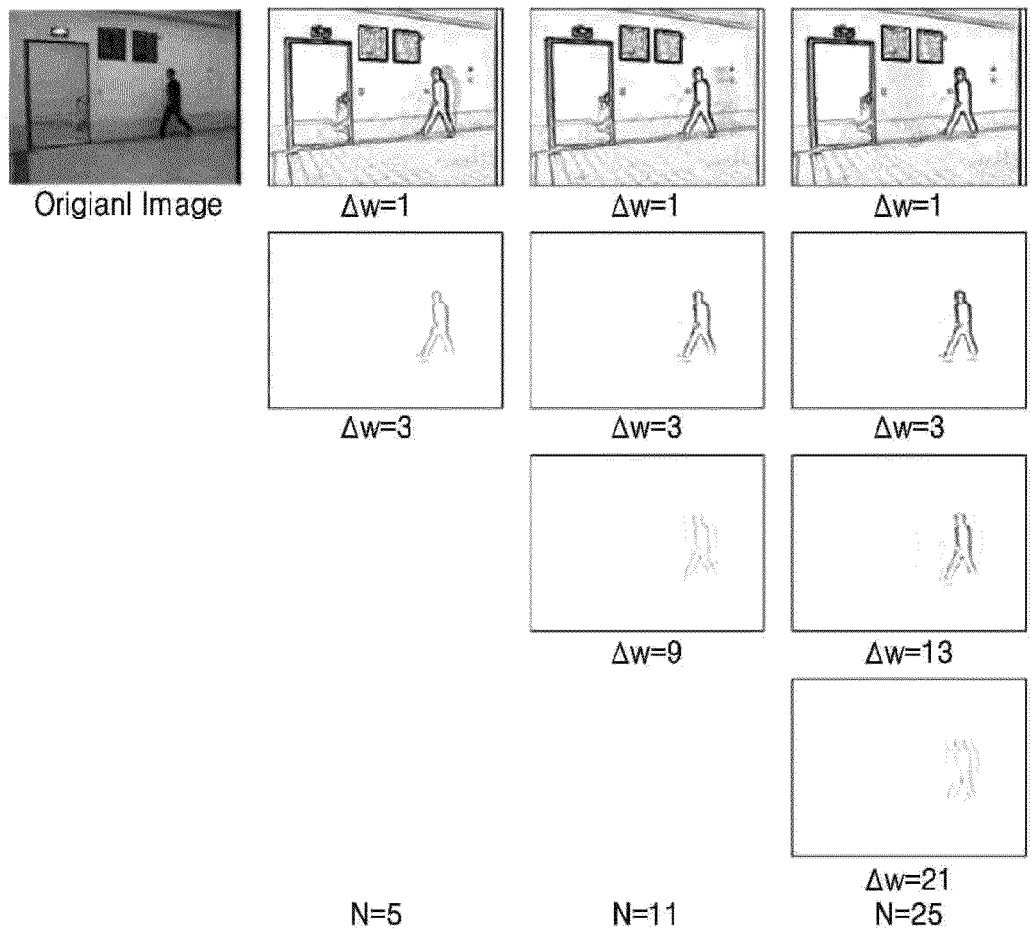
FIG. 7A
Input
FIG. 7B
FFT
FIG. 7C
Proposed

| FIG. 8A | FIG. 8B | FIG. 8C | FIG. 8D |
|---|---|---|---|
| Input | Temporal Difference | Background Subtraction | Proposed |
|  Frame 48 |  |  |  |
|  Frame 164 | | 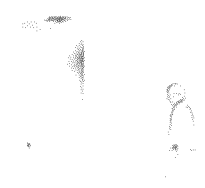 | |
| FIG. 9A | FIG. 9B | FIG. 9C | FIG. 9D |
|---|---|---|---|
| Input | Temporal Difference | Background Subtraction | Proposed |
|  Frame 194 |  |  |  |
|  Frame 268 |  |  |  |
|  Frame 397 |  |  |  |

FIG. 10A    FIG. 10B    FIG. 10C    FIG. 10D
      
Frame 194                Frame 55
      
Frame 268                Frame 153
      
Frame 397                Frame 342

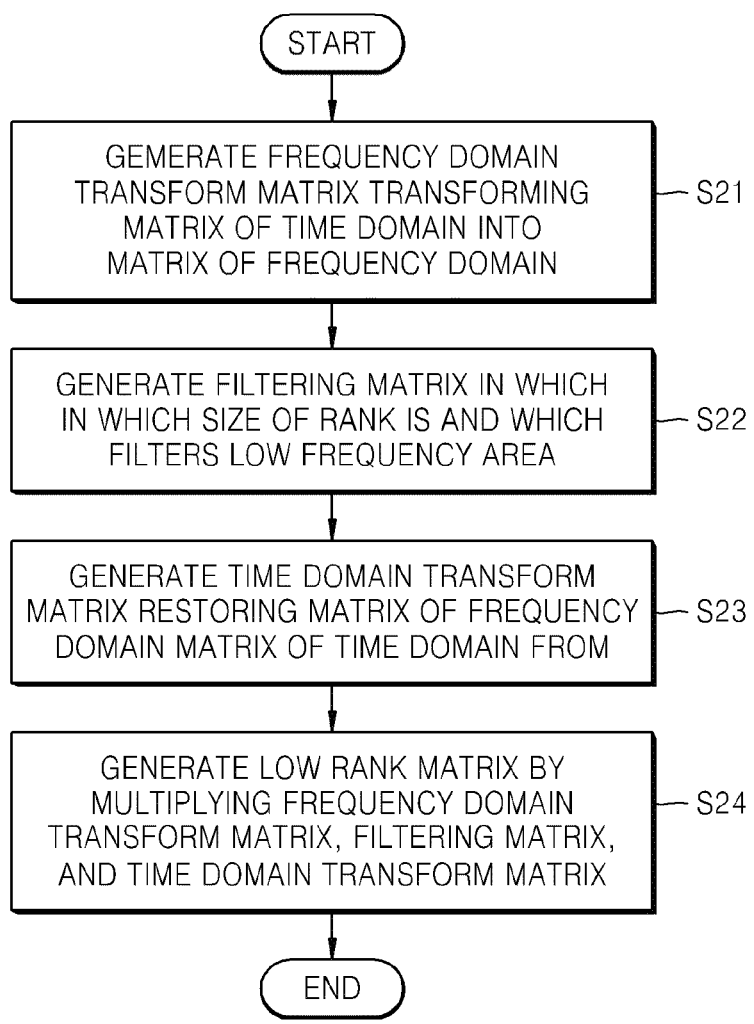

METHOD AND SYSTEM FOR DETECTING MATRIX-BASED MOTION INCLUDING FREQUENCY TRANSFORM AND FILTERING

CROSS-REFERENCE TO RELATED PATENT APPLICATION

This application claims priority from Korean Patent Application No. 10-2012-0048314, filed on May 7, 2012, in the Korean Intellectual Property Office, the disclosure of which is incorporated herein in its entirety by reference.

BACKGROUND

1. Field

Methods and apparatuses consistent with exemplary embodiments relate to detecting motion based on a matrix including frequency transform and filtering, and more particularly, to detecting motion of an image by multiplying a calculation matrix that performs frequency domain transform, filtering, and time domain transform in a single operation, with a matrix of a time domain.

2. Description of the Related Art

A general surveillance system includes a surveillance camera to monitor an image captured using the surveillance camera via a monitor and to occasionally store images. The surveillance system requires that a surveillant monitor every single screen or the surveillance system store any images including unnecessary images where no motion is generated, and thus, a human resource is additionally required or space for storing images becomes short.

To solve the above problem, surveillance systems of these days use a motion detection method, in which a load of a surveillance camera is reduced, and frames of two images that are sequentially input are compared with each other for fast motion detection to thereby determine whether a motion is generated and detect only a motion area.

Japanese Patent No. 4526592 discloses a method in which a motion area is detected using a discrete cosine transform method to transform image signals, and a calculation amount related to motion vector detection is reduced.

Also, examples of related art motion detection methods include a temporal difference method, a background subtraction method and a motion detection method. In the temporal difference method, motion estimation using a difference in time domains is used. In the background subtraction method, a fixed background area is removed to extract a motion area, and in the motion detection method, Gaussian modeling is used to distinguish between a foreground and a background to separate out the foreground that includes motion.

According to the related art motion detection methods, the number of images from which motion may be detected at a resolution of a size of 640×840 is about 6 frames/sec, and thus, calculation complexity thereof is high to be used in a real-time surveillance system.

SUMMARY

One or more exemplary embodiments provide a method and system for detecting motion fast and accurately by multiplying a matrix of a time domain representing variation in each of pixel values of an image by a matrix that is capable of performing frequency domain transform, filtering, and time domain transform in a single operation to thereby detect a motion based on matrix calculation with respect to all pixels of all positions of the image.

One or more exemplary embodiments also provide a method and system for detecting a motion in which in matrix calculation for motion detection, centro-symmetry is used to calculate repeated calculations by grouping them and a fixed point is used to thereby reduce calculation complexity.

According to an aspect of an exemplary embodiment, there is provided a method of detecting motion, the method including: generating a time domain matrix including vectors corresponding to variation of pixel values as elements of the time domain matrix, of a video image including a plurality of frames; generating a motion matrix from which a low frequency area of the video image is removed by multiplying the time domain matrix by a low rank matrix; and generating a result image including a plurality of frames in which vectors, which are elements of the motion matrix, are included as variation of motion pixel values.

After transforming the time domain matrix into a frequency domain, the low rank matrix filters the low frequency area, and restores a time domain image from the frequency domain matrix, and the low rank matrix is a matrix that is calculated in advance before the video image is obtained from a camera.

The low rank matrix may have centro-symmetry.

The elements of the low rank matrix may have only fixed points.

According to an aspect of another exemplary embodiment, there is provided a motion detection system including: an image-matrix transforming unit which generates a time domain matrix including vectors corresponding to variation in pixel values as elements of the time domain matrix, of a video image including a plurality of frames; a low rank matrix applying unit which generates a motion matrix from which a low frequency area of the video image is removed, by multiplying the time domain matrix by a low rank matrix; a motion image obtaining unit which generates a result image including a plurality of frames in which vectors, which are elements of the motion matrix, are included as variation of motion pixel values.

After transforming the time domain matrix into a frequency domain, the low rank matrix filters the low frequency area, and restores a time domain image from the frequency domain matrix, and the calculation matrix may be a matrix that is calculated in advance before being multiplied by the time domain matrix.

The low rank matrix may have centro-symmetry.

The elements of the low rank matrix may have only fixed points.

According to an aspect of another exemplary embodiment, there is provided a method of detecting motion, the method including: generating a frequency domain transforming matrix which transforms a time domain matrix including variation of pixel values of a video image into a frequency domain matrix; generating a filtering matrix which filters a low frequency component of the video image; generating a time domain transform matrix which transforms the frequency domain matrix into a time domain matrix; and generating a low rank matrix by multiplying the frequency domain transform matrix, the filtering matrix, and the time domain transform matrix.

The method may further include multiplying the low rank matrix by a time domain matrix including vectors regarding variation of pixel values of an input video image as elements of the time domain matrix.

A rank of the frequency domain transform matrix may correspond to a number of frames of the input video image from which the variation of the pixel values are extracted.

The low rank matrix L may be expressed as $L = D_N^T \cdot E_{M,N} \cdot D_N$ by using the frequency domain transform matrix $D_N$, the filtering matrix $E_{M,N}$, and the time domain transform matrix $D_N^T$, where N denotes a number of frames of the input video image from which the variation of the pixel values are extracted, and M denotes a bandwidth of the filtering matrix.

A rank of the low rank matrix may be a value obtained by subtracting a rank of the filtering matrix from a rank of the frequency domain transform matrix.

The low rank matrix L may have centro-symmetry.

The elements of the low rank matrix may have only fixed points.

The frequency domain transform matrix may use a discrete cosine transform method.

The filtering matrix $E_{M,N}$ may be expressed as $$E_{M,N} = \mathrm{diag}(\underbrace{0, \cdots, 0, 1, \cdots, 1}_{\substack{M \quad N-M \\ N}}) \text{ (where } M < N\text{),}$$

where M is a bandwidth of the filtering matrix, and N is a number of frames of the input video image from which the variation of the pixel values are extracted.

According to an aspect of another exemplary embodiment, there is provided a motion detection system, including: a frequency domain transforming unit which generates a frequency domain transform matrix transforming a time domain matrix including variation of pixel values of a video image into a frequency domain matrix; a filtering unit which generates a filtering matrix filtering a low frequency component of the video image; a time domain transforming unit which generates a time domain transform matrix transforming the frequency domain matrix into a time domain matrix; and a low rank matrix generating unit which generates a low rank matrix by multiplying the frequency domain transform matrix, the filtering matrix, and the time domain transform matrix.

The motion detection system may further include a low rank matrix applying unit which multiplies the low rank matrix by a time domain matrix including vectors with respect to variation of pixel values of an input video image as elements of the time domain matrix.

A rank of the frequency domain transform matrix may correspond to a number of frames of the input video image from which variation of the pixel values are extracted.

The low rank matrix L may be expressed as $L = D_N^T \cdot E_{M,N} \cdot D_N$ by using the frequency domain transform matrix $D_N$, the filtering matrix $E_{M,N}$, and the time domain transform matrix $D_N^T$, where N denotes a number of frames of the input video image from which the variation of the pixel values are extracted, and M denotes a bandwidth of the filtering matrix.

A rank of the low rank matrix may be a value obtained by subtracting a rank of the filtering matrix from a rank of the frequency domain transform matrix.

The low rank matrix L may have centro-symmetry.

The elements of the low rank matrix may have only fixed points.

The frequency domain transform matrix may use a discrete cosine transform method.

The filtering matrix $E_{M,N}$ may be expressed as $$E_{M,N} = \mathrm{diag}(\underbrace{0, \cdots, 0, 1, \cdots, 1}_{\substack{M \quad N-M \\ N}}) \text{ (where } M < N\text{),}$$

where M is a bandwidth of the filtering matrix, and N is a number of frames of the input video image from which the variation of the pixel values are extracted.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

The above and other aspects will become more apparent by describing in detail exemplary embodiments thereof with reference to the attached drawings, in which:

FIG. 6 shows a simulation result representing a motion detection result based on various filtering bandwidths according to a related art;

FIGS. 7A to 7C show views for comparing a result of detecting a motion by using a discrete cosine transform method with a result of detecting a motion by using a fast Fourier transform (FFT) method, according to an exemplary embodiment;

FIGS. 8A to 8D illustrate respective results of detecting a motion at a fixed exposure value according to a related art and according to an exemplary embodiment;

FIGS. 9A to 9D illustrate respective results of detecting a motion at an automatic exposure value according to a related art and according to an exemplary embodiment;

FIGS. 10A to 10D illustrate results of graph-cut of images from which motion is detected using a motion detection system according to an exemplary embodiment;

FIG. 12 is a flowchart illustrating a method of generating a low rank matrix in reference to FIG. 4, according to an exemplary embodiment.

DETAILED DESCRIPTION OF THE EXEMPLARY EMBODIMENTS

Figure 1:
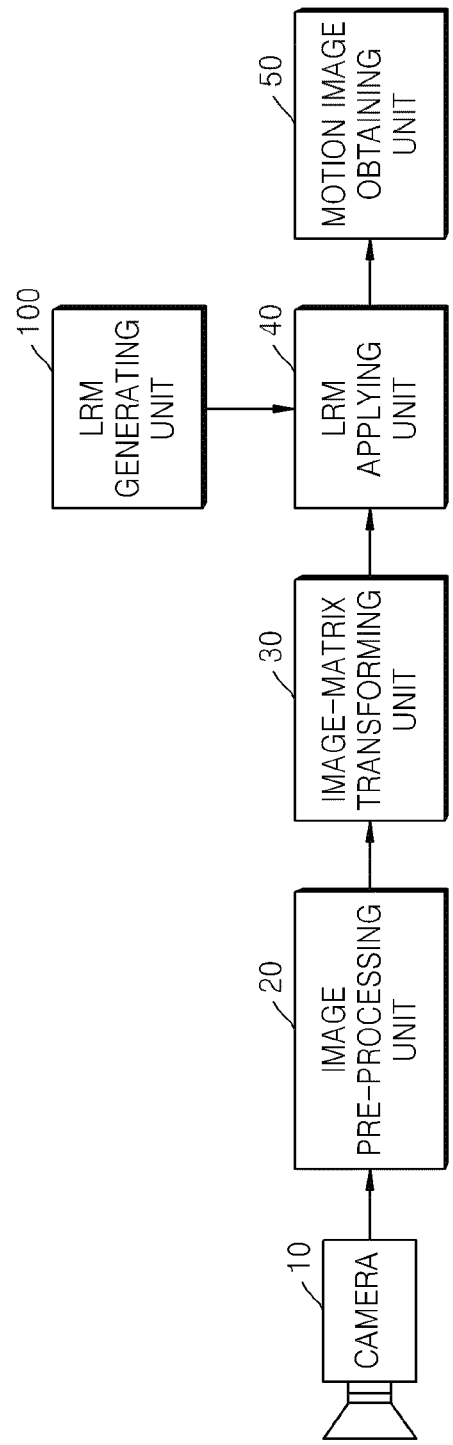
FIG. 1 is a schematic block diagram of a motion detection system based on a matrix, according to an exemplary embodiment.

The exemplary embodiments will now be described more fully with reference to the accompanying drawings. The exemplary embodiments will be described in detail such that one of ordinary skill in the art may easily implement the inventive concept. It should be understood that these embodiments may vary but do not have to be mutually exclusive. For example, particular shapes, structures, and properties according to a predetermined embodiment described in this specification may be modified in other embodiments without departing from the spirit and scope of the inventive concept. In addition, positions or arrangement of individual components of each of the embodiments may also be modified without departing from the spirit and scope inventive concept. Accordingly, the detailed description below should not be construed as having limited meanings but construed to encompass the scope of the claims and any equivalent ranges thereto. In the drawings, like reference numerals denote like elements in various aspects.

Hereinafter, the exemplary embodiments will now be described more fully with reference to the accompanying drawings.

First, a motion detection method according to an exemplary embodiment may be recently performed based on temporal consistency regarding pixels on the same positions in a predetermined number of frames. Also, in the motion detection method according to the current exemplary embodiment, independency of each pixel is assumed.

FIG. 1 is a schematic block diagram of a motion detection system based on a matrix according to an exemplary embodiment.

Referring to FIG. 1, the motion detection system includes a camera 10, an image pre-processing unit 20, an image-matrix transforming unit 30, a low rank matrix applying unit 40, a motion image obtaining unit 50, and a low rank matrix generating unit 100.

First, the camera 10 is installed in an area where image capturing is required, and provides an image obtained by capturing a corresponding area. The camera 10 may be a device capable of capturing an image, such as a surveillance camera, a camcorder, or a closed-circuit television (CCTV).

Next, the image pre-processing unit 20 transforms input image data provided from the camera 10 from an analog signal into a digital signal. Although the image pre-processing unit 20 is included outside the camera 10, the image pre-processing unit 20 may also be included in the camera 10. The image pre-processing unit 20 transforms the input image into an image digital signal so that the motion detection system according to the current embodiment may receive the input image to quickly detect motion.

Next, the image-matrix transforming unit 30 aligns the input image in a time-spatial, three-dimensional space and represents variation in pixel values at a predetermined position as vectors to deduce a time domain matrix which includes corresponding vectors as elements. A method of deducing a time domain matrix by using the image-matrix transforming unit 30 will be described with reference to FIG. 2.

FIGS. 2A to 2E illustrate images with motion and without motion arranged on a time spatial axis, according to exemplary embodiments.

Figure 2A:
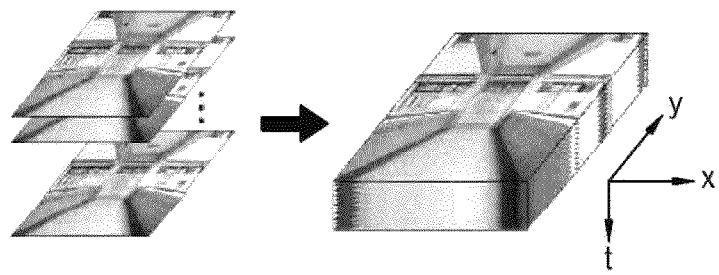
FIGS. 2A to 2E illustrate images with motion and without motion arranged on a time spatial axis, according to exemplary embodiments.
Figure 2B:
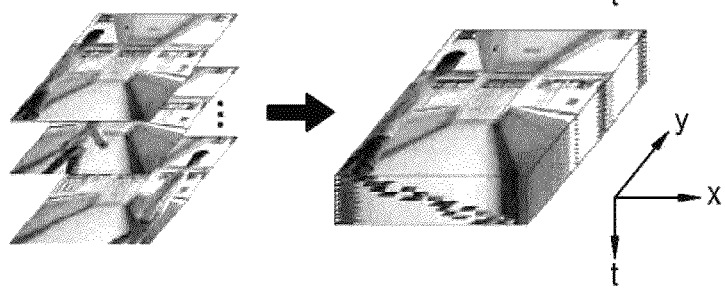

Referring to FIGS. 2A and 2B, the image-matrix transforming unit 30 arranges respective frame images of a video image along space-time x-y-t axes. That is, the video image conceptually refers to various images that correspond to respective frames and are output at predetermined time intervals, and thus, the images corresponding to the respective frames may be arranged with respect to the t-axis.

Images of FIGS. 2A and 2B respectively show an image without motion and an image with motion arranged along a time-space axis. An image of FIG. 2C, which is obtained by cutting out the lowermost portion of the image of FIG. 2A, that is, a frame image without motion arranged in a time-space, in a vertical direction with respect to the y-axis, includes only vertical patterns. However, an image of FIG. 2D, which is obtained by cutting out the lowermost portion of the image of FIG. 2B, that is, a frame image with motion arranged in a time-space, in a vertical direction with respect to the y-axis, includes patterns according to motion besides vertical patterns.

Figure 2C:
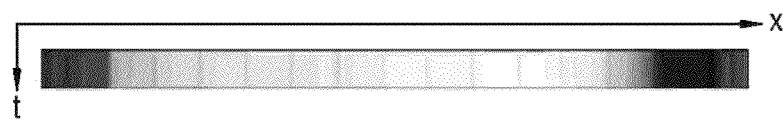
Figure 2D:
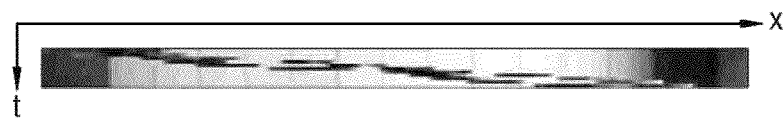

That is, an image without motion forms only vertical patterns on the x-t plane as illustrated in FIG. 2C, but an image with motion includes motion patterns in addition to vertical patterns on the x-t plane as illustrated in FIG. 2D.

Figure 2E:
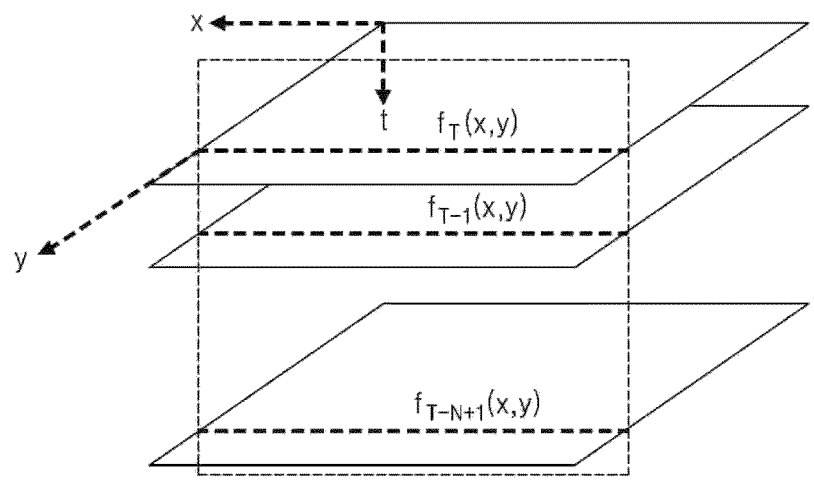

In more detail, as illustrated in the time-space as shown in FIG. 2E, when $f_t(x,y)$ is defined as coordinates of a two-dimensional, H*W image having a height H and a width W of a frame t, the image-matrix transforming unit 30 may set a three-dimensional, H*W*N image to be f(x,y,t) with respect to the most recent N frame images ($x \in [0, W-1]$, $y \in [0, H-1]$, $t \in [T, T+N-1]$, and T denotes a current frame). Accordingly, a one-dimensional image vector f(x,y,t) at a position (x, y) may be represented by $f_{x,y}(t)$. Each vector denotes variation in each of pixel values with respect to the t-axis in the three-dimensional space-time x-y-t, that is, pixel intensity.

Accordingly, a value of each pixel position (x, y), according to time may be represented by a matrix by using $f_{x,y}(t)$. That is, vectors representing variation in pixel values of the same positions in N frames with respect to time t may be represented by a matrix as in Equation 1 below.

$$f_{x,y}(t)=f, \text{ where } f \text{ is an } N\text{-by-1 matrix.} \quad \text{[Equation 1]}$$

If there is no motion in a video image as in FIG. 2A, a vector value of $f_{x,y}(t)$ may be approximately uniform like white noise. In contrast, if there is motion in a video image as in FIG. 2B, a value of a primary vector $f_{x,y}(t)$ is varied. A time domain matrix f reflects the above variation in pixel values. Accordingly, the motion detection system according to the current embodiment removes uniform component values with respect to time from among vector values of the time domain matrix f, and detects only values including motion.

Next, the low rank matrix applying unit 40 multiplies the time domain matrix f by a low rank matrix generated by the low rank matrix generating unit 100, which will be described later. An operation of the low rank matrix applying unit 40 will be described with reference to FIG. 3.

Figure 3:
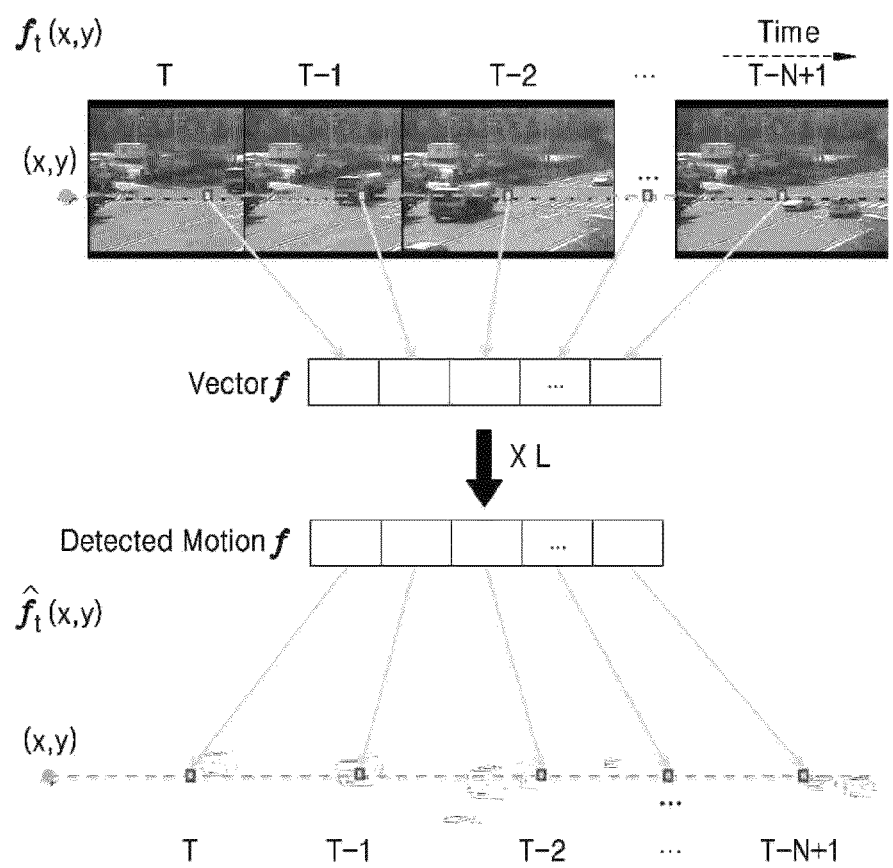
FIG. 3 is a schematic view illustrating a method of detecting motion according to an exemplary embodiment.

FIG. 3 is a schematic view illustrating a motion detection method according to an exemplary embodiment.

The low rank matrix applying unit 40 may multiply a calculation matrix L by the time domain matrix f to obtain a motion matrix $\hat{f}$ representing the obtained results of the motion area. In the present specification, a calculation matrix that is multiplied in order to detect motion will be referred to as a low rank matrix L. That is, the motion matrix $\hat{f}$ may be obtained based on Equation 2 below.

$$\hat{f}=L \cdot f \quad \text{[Equation 2]}$$

The motion matrix $\hat{f}$ includes vectors corresponding to variation in values of pixels from which a motion area is detected, as elements. In other words, while the time domain matrix f includes information about all pixel values of an image, the motion matrix $\hat{f}$ includes information about pixel values of an image from which only a motion area is extracted.

The low rank matrix L is multiplied by the original, time domain matrix f in order to obtain the motion matrix $\hat{f}$, and may be calculated in advance before performing an algorithm of the motion detecting system, according to an exemplary embodiment. The same low rank matrix L may be used for all pixels.

According to the motion detection method according to the current embodiment, motion is detected by matrix multiplication in which the low rank matrix applying unit 40 multiplies the previously set, low rank matrix L, and thus, process speed thereof may be faster and calculation complexity may be reduced compared to methods according to the conventional art.

After transforming the time domain matrix f into a frequency domain, the low rank matrix generating unit 100 filters low frequency areas, and generates a low rank matrix L for restoring the frequency domain matrix again to a time domain and supplies the low rank matrix L to the low rank matrix applying unit 40. An operation of the low rank matrix generating unit 100 will be described below.

Finally, the motion image obtaining unit 50 generates an image including continuous frames in which pixel values vary according to vectors, which are elements of the motion matrix $\hat{f}$. By reconstructing an image based on the motion matrix $\hat{f}$ by setting the motion matrix $\hat{f}$ calculated regarding each pixel position as pixel variation values of an original position (x, y), images, in which only motion is left, are restored from among N images as a result of motion detection. That is, the motion image obtaining unit 50 restores an image from the motion matrix $\hat{f}$, and the image restored by the motion image obtaining unit 50 is an image representing only a motion area of the original image.

Next, a structure of the low rank matrix generating unit 100 will be described in detail with reference to FIG. 4.

Figure 4:
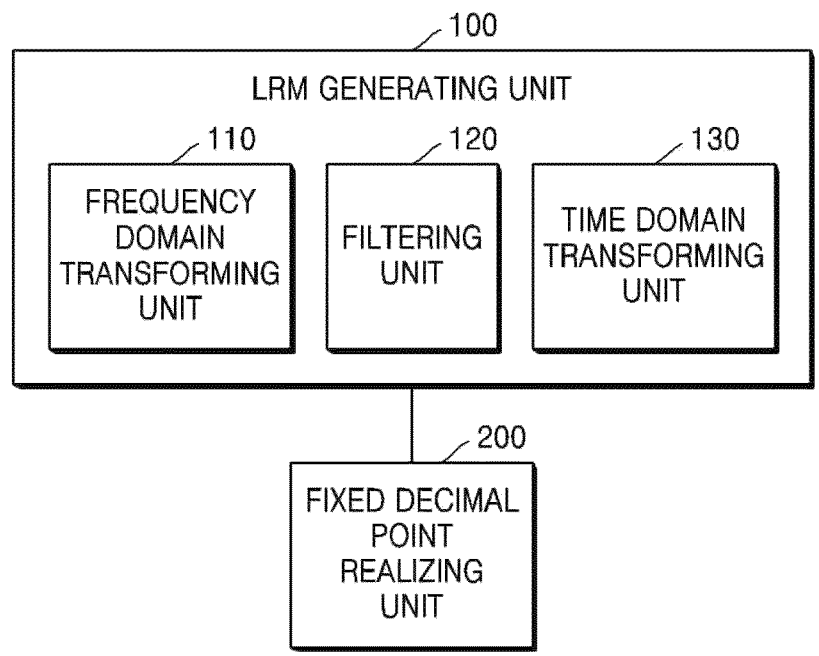
FIG. 4 is a schematic structural diagram illustrating a structure of a low rank matrix generating unit and a fixed decimal point realizing unit, according to an exemplary embodiment.

FIG. 4 is a schematic structural diagram illustrating a structure of the low rank matrix generating unit 100 and a fixed decimal point realizing unit 200, according to an exemplary embodiment.

As illustrated in FIG. 4, the low rank matrix generating unit 100 includes a frequency domain transforming unit 110, a filtering unit 120, and a time domain transforming unit 130.

First, the overall operation of the low rank matrix generating unit 100 will be described. The low rank matrix generating unit 100 generates a low rank matrix L that is to be multiplied by a time domain matrix of an image in order to deduce a motion matrix representing only a motion area of the image. A rank of the low rank matrix L is smaller than a rank of a time domain matrix of an original image by a filtering bandwidth.

In detail, the low rank matrix generating unit 100 generates a matrix that is capable of performing frequency domain transform, filtering, and time domain transform which may implement a motion detection system. According to an exemplary embodiment, the low rank matrix generating unit 100 may use a matrix transform using a discrete cosine transform in which only real numbers are used, to represent an algorithm of a motion detection method according to the current embodiment as matrix multiplication.

According to the method illustrated in FIG. 3 as described above, the motion detection system according to the current embodiment may detect a motion area of an image by a low rank matrix L.

First, the frequency domain transforming unit 110 generates a frequency domain transform matrix for transforming an image of a time domain into an image of a frequency domain. To use a frequency domain in order to extract a motion value of an image is reliable in regard to noise and signal intensity. In addition, when analyzing an image via high-pass filtering, values of a low frequency domain, that is, values of areas without motion may be easily removed.

Figure 5:
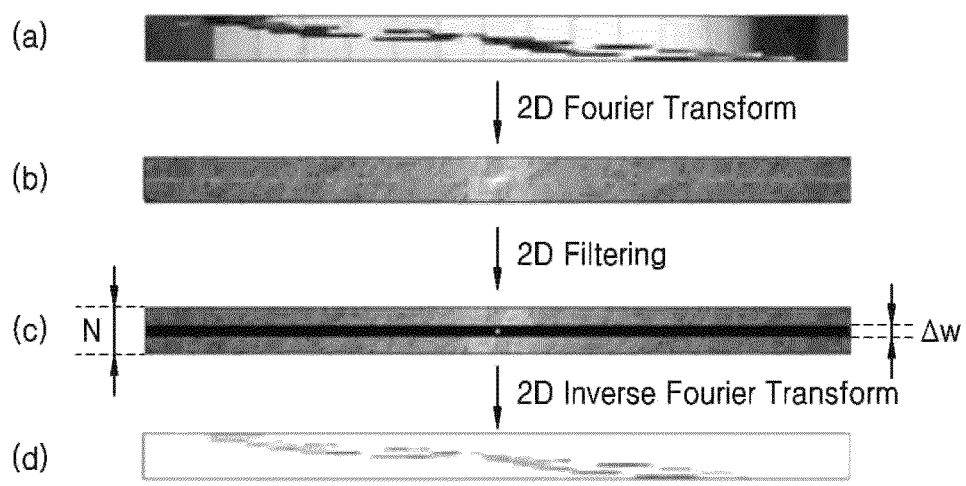
FIG. 5 is a schematic view illustrating a result of frequency domain transformation, filtering and time domain transformation on the image of FIG. 2E, according to an exemplary embodiment.

FIG. 5 is a schematic view illustrating a result of frequency domain transformation, filtering and time domain transformation on the image of FIG. 2E, according to an exemplary embodiment.

Referring to FIG. 5, the image of FIG. 2E is shown in an image (a), and a result of performing two-dimensional Fourier transform to the image (a) according to a frequency domain transform matrix generated by the frequency domain transforming unit 110 is shown in an image (b). Since it is an image signal instead of a voice signal, the two-dimensional Fourier transform is performed.

Although a related art method of transforming an image of a time domain into a frequency domain using Fourier transform is illustrated in FIG. 5, the frequency domain transforming unit 110 is not limited thereto, and other frequency domain transforming methods may also be used in the motion detection system according to the current embodiment. Any rectangular transform based on frequency may be used as a transform method according to an exemplary embodiment, and features of each embodiment comply with features of each transform method.

In addition, the frequency domain transforming unit 110 may generate a frequency domain transform matrix by using a discrete cosine transform to transform frequencies. Since the discrete cosine transform may be easily expressed as a matrix, the frequency domain transforming unit 110 may easily realize a process for implementing the motion detection method according to the current embodiment in the form of matrix multiplication.

Next, the filtering unit 120 generates a filtering matrix to be multiplied by a frequency-transformed matrix, to filter out unmoving areas to remove the same.

The filtering matrix is used to filter a low frequency area, which is an unmoving area, that is, vertical pattern domains illustrated in FIGS. 2A to 2D, which form predetermined patterns in each frame, and to remove the same.

By filtering and removing the low frequency area which denotes an unmoving area of an image with respect to the transformed image, only a high frequency domain representing a motion area as illustrated in as an image (c) of FIG. 5 is left.

That is, a stable area of an image forms a low frequency, and a motion area that generates a difference in pixel values in previous and subsequent frames forms a high frequency, and thus, if a low frequency is filtered, only a high frequency component indicating a motion area as illustrated in as the image (c) of FIG. 5 is left. The image (c) of FIG. 5 shows a result of filtering with a bandwidth of Δw. Also, N denotes the number of frames from which variation in pixel values is extracted.

Next, the time domain transforming unit 130 generates a time domain transform matrix for transforming a filtered frequency domain matrix into a time domain again. That is, the time domain transforming unit 130 performs inverse frequency transform to output a matrix that has been transformed into a frequency domain to filter out low frequency areas, in a time domain again.

An image (d) of FIG. 5 shows a result of performing two-dimensional inverse Fourier transform on a result of filtering illustrated in the image (c) of FIG. 5 by using a time domain transform matrix generated by the time domain transforming unit 130. Referring to the image (d) of FIG. 5, as a low frequency component is removed by filtering, only motion patterns in which repeated vertical patterns are removed from the image (a) are left.

The low rank matrix generating unit 100 multiplies a frequency domain transform matrix, a filtering matrix, and a time domain transform matrix described above to generate a low rank matrix L.

Accordingly, the low rank matrix L may be multiplied by a matrix indicating an original matrix according to an exemplary embodiment so as to perform a process of frequency domain transform, filtering, and time domain transform in a single operation. In detail, according to the current embodiment, the low rank matrix L may perform discrete cosine transform, filtering, and discrete cosine inverse transform calculation in a single operation. Discrete cosine transform has an energy compaction property, and thus, a result of transform is concentrated on only predetermined values within a low frequency component.

The overall process of the motion detection method using a discrete cosine transform method as a frequency transform method according to an exemplary embodiment is as follows. The frequency domain transforming unit 110, the filtering unit 120, and the time domain transforming unit 130 of the low rank matrix generating unit 100 express a frequency transform algorithm, a filtering algorithm, and an inverse transform algorithm each using a discrete cosine matrix, as a form of matrix multiplication. The low rank matrix generating unit 100 may express a series of sequential algorithms as one matrix, that is, a low rank matrix L. This may be expressed as in Equation 3 below.

$$L = D_N^T \cdot E_{M,N} \cdot D_N \quad \text{[Equation 3]}$$

In Equation 3, L denotes a low rank matrix, $D_N$ denotes a frequency transform matrix using a discrete cosine transform method, $E_{M,N}$ denotes a filtering matrix, and $D_N^T$ denotes a time domain transform matrix using a discrete cosine inverse transform method.

Here, the frequency transform matrix $D_N$ using the discrete cosine transform method generated by the frequency domain transforming unit 110 may be expressed by Equation 4 as below.

$$D_N = \sqrt{\frac{2}{N}} \{d_{ij}\} \left( \text{where } d_{i,j} = \cos\left|\frac{\pi}{N}\left(i - \frac{1}{2}\right)\left(j - \frac{1}{2}\right)\right| \right) \quad \text{[Equation 4]}$$

In Equation 4, N denotes the number of frames from which motion is to be detected, and i and j respectively denote a row number and a column number of each matrix.

In this case, a matrix formed by performing one-dimensional discrete cosine transform to the matrix f and expressed in a frequency domain may be represented as F, and F may be expressed as $F = D_N \cdot f$ by referring to Equations 2 and 3.

Next, the low rank matrix generating unit 100 multiplies the filtering matrix $E_{M,N}$ generated by the filtering unit 120 in order to filter an unmoving area with respect to the frequency-transformed matrix F.

The filtering matrix $E_{M,N}$ filters a low frequency area which is an unmoving area, that is, vertical pattern domains which form uniform patterns in each frame when referring to the example of FIG. 3 described above, and removes the same. The filtering matrix $E_{M,N}$ may be expressed as in Equation 5 below.

$$E_{M,N} = \mathrm{diag}(\underbrace{\underbrace{0, \cdots, 0}_{M}, \underbrace{1, \cdots, 1}_{N-M}}_{N}) \text{ (where } M < N) \quad \text{[Equation 5]}$$

As shown in Equation 5, the filtering matrix $E_{M,N}$ takes values of a diagonal matrix with respect to an entire matrix in which M component is zero and the remaining N-M components is 1, as a filtering matrix. M denotes a filtering bandwidth $\Delta w$. By multiplying $E_{M,N}$ by the matrix F using $M=\Delta w$, a low M frequency component may be filtered.

In the low rank matrix L, the filtering matrix $E_{M,N}$ contributes the most in reducing calculation time. The calculation time and performance of the motion detecting method according to the current embodiment vary according to the filtering bandwidth $\Delta w$ which reduces the number of ranks, from among features of the matrix $E_{M,N}$.

According to an exemplary embodiment, for low frequency filtering for excluding an unmoving area, the filtering unit 120 may set first and second frequency components as 0. If the first and second frequency components are set as 0, the motion detection system according to the current embodiment may select the filtering matrix $E_{M,N}$ in which a bandwidth $\Delta w$ is 2, to detect a motion area.

Further, when assuming that $M=\Delta w=2$, the low rank matrix L has a rank N−2 which is smaller than the rank N of the original matrix, and becomes a centro-symmetric matrix. Consequently, as described above, discrete cosine transform, filtering with a bandwidth of 2, and inverse discrete cosine transform regarding the original matrix may be performed using matrix multiplication at the same time.

In detail, when M=2, a filtering bandwidth $\Delta w$ is 2, and thus, centro-symmetry is generated, and accordingly, repeated ranks are generated in the low rank matrix L. Accordingly, in order to reduce complexity in calculation, vector elements that share a rank of the low rank matrix L may be calculated by grouping them so as to reduce calculation of matrix multiplication. If $\Delta w$ is set to be 2, this process may be represented as in Equation 6 below.

$$\hat{F} = E_{2,N} \cdot F \quad \text{[Equation 6]}$$

In Equation 6, $\hat{F}$ is a matrix formed by setting a bandwidth $\Delta w$ to be 2 and filtering a low frequency component from the matrix F.

According to an exemplary embodiment, if a discrete cosine transform is used as a frequency domain transform method, the time domain transforming unit 130 uses an inverse discrete cosine transform method to generate a time domain transform matrix $D_N^T$, and a result of motion detection may be expressed as in Equation 7 below.

$$\hat{f} = D_N^T \cdot \hat{F} \quad \text{[Equation 7]}$$

Accordingly, according to the current embodiment, when $\Delta w = 2$, the overall motion detection method may be expressed by using Equations 6 and 7 as in Equation 8 below.

$$\hat{f} = L \cdot f = D_N^T \cdot E_{2,N} \cdot D_N \cdot f \quad \text{[Equation 8]}$$

As shown in Equation 8, the low rank matrix L may be expressed as $D_N^T \cdot E_{2,N} \cdot D_N$, which includes values calculated in advance. That is, by multiplying f by the low rank matrix L, a matrix $\hat{f}$, which is a result from which motion is detected, may be obtained.

In addition, when $\Delta w = 2$, a rank of the low rank matrix L is N−2, and thus the low rank matrix L has centro-symmetry. The rank of the low rank matrix L which is centro-symmetric is repeated, and the low rank matrix L satisfies $\{d_{ij} = d_{ji}\}$ and $\{d_{ij} = d_{(N-j+1)(N-i+1)}\}$. Accordingly, as described above, the motion detection system according to the current embodiment may increase calculation speed by calculating the same ranks together which is grouped.

The fixed decimal point realizing unit 200 as illustrated in FIG. 4 is likely to increase calculation complexity if the low rank matrix L has a floating point value, and thus, allows to calculate the low rank matrix L using a fixed point.

The low rank matrix L, in which multiplications of the filtering matrix $E_{M,N}$ for filtering low frequency components are included, includes an ideal filter, and includes dynamic points.

The fixed decimal point realizing unit 200 may transform the low rank matrix L so that the low rank matrix L includes only fixed points in order to reduce calculation complexity by calculating using only calculated values in the form of integers. The fixed decimal point realizing unit 200 transforms first the size, that is, transforms a floating point number into a fixed point number by scaling.

A process in which the fixed decimal point realizing unit 200 approximates the floating point in the low rank matrix L into the fixed point may include up-scaling, quantization, transform calculation, and down-scaling. To prevent an overflow, the fixed decimal point realizing unit 200 may set a scaling level as shown in Equation 9 below.

$$2^{Level}(\max(\mathrm{abs}(L)) \cdot 255 \cdot N) < 2^{B-1} \Rightarrow \mathrm{Level} = \mathrm{floor}(B - 1 - \log_2(255 \cdot \max(|L|) \cdot N))$$ [Equation 9]

In Equation 9, B denotes the number of data bus bits determined by an operating system and system architecture (of 32 bits or 64 bits used in a personal computer). Also, N denotes a vector size of f, which is the rank of the original matrix. According to an exemplary embodiment, a maximum of pixel intensity may be set as 255. Up-scaling and down-scaling may be both realized using a shift operator. However, up-scaling and down-scaling may be both implemented by multiplying two instead of the shift operator.

A result $\tilde{L}$ obtained by transforming the number of the low rank matrix L by the fixed decimal point realizing unit 200 by up-scaling into a fixed point number may be expressed as in Equation 10.

$$\tilde{L} = \mathrm{round}(L \circ 2^{Level})$$ [Equation 10]

As shown in Equation 10, $\tilde{L}$ is a rounded value of the original low rank matrix L multiplied by two to the level power in which the level is obtained in Equation 10 element-wise. The symbol ○ indicates an elementwise multiplier, by which the same calculation is performed for any element regardless of the size of a matrix.

$\tilde{L}$ consisting of only fixed points may be used instead of the low rank matrix L to obtain calculation efficiency; however, due to the scale problem, for $\tilde{L} \cdot \tilde{f}$, matrix calculation by $\tilde{f}$ may not be possible. Accordingly, a calculation value of $\tilde{L} \cdot \tilde{f}$ is to be further approximated as in Equation 11 below.

$$\tilde{f} \cong (\tilde{L} \cdot f) \diamond 2^{-Level}$$ [Equation 11]

By using $\tilde{L}$ that is deduced by the fixed decimal point realizing unit 200, calculation complexity of $\tilde{f}$ which is a matrix from which only motion is detected may be reduced in the above-described process.

FIG. 6 shows a simulation result of a motion detection result based on various filtering bandwidths according to a related art.

Referring to FIG. 6, a degree of detected motion varies according to the filtering bandwidth Δw that may be given in an N by N matrix. Referring to FIG. 6, if N is 5, Δw may be 1 or 3, and thus, when Δw=1, an edge of an image may be detected but motion may be hardly detected; when Δw=3, a motion area may be detected. Like when N=5, if N=11 or N=25, if a bandwidth is too small for a matrix size, noise information except motion information is extracted together. Also, if Δw is too big for a matrix size, information about a motion area also disappears.

Also, if Δw is big in the case that N=11 or N=25, a ringing effect is generated so that the motion area is not clear. For reference, referring to the result of FIG. 6, the best detection result is shown when Δw=3. A motion detection result according to various filtering bandwidths as illustrated in FIG. 6 may also be applied to the motion detection system according to the current embodiment. FIG. 6 shows a result based on a Fourier transform method. Here, a case that Δw=3 when using the Fourier transform method in FIG. 6 is equal to a case that Δw=2 when using a discrete cosine transform method according to the current embodiment.

As described above, when a discrete cosine transform method is used, and when Δw=2, centro-symmetry is generated. Accordingly, repeated ranks are generated in the low rank matrix L, and thus, by grouping and calculating vector elements that share the rank of $\tilde{L}$, calculation complexity may be reduced.

FIGS. 7A to 7C show views for comparing a result of detecting a motion by using a discrete cosine transform method with a result of detecting a motion by using a fast Fourier transform (FFT) method, according to an exemplary embodiment.

FIG. 7A is an input image, and FIGS. 7B and 7C illustrate motions extracted from the input image, respectively. As shown in FIG. 7B, a ringing effect is generated on the image detected using a FFT method. However, in the image of FIG. 7C using the motion detection method according to the current embodiment of a discrete cosine transform method, the ringing effects is reduced.

FIGS. 8A to 8D illustrate respective results of detecting a motion at a fixed exposure value according to a related art and according to an exemplary embodiment.

FIG. 8A show two motion images. FIG. 8B shows results of detecting motion from the motion images of FIG. 8A by using a temporal difference method according to a related art. FIG. 8C shows results of detecting motion by using a related art subtraction method. FIG. 8D shows results of detecting motion according to the motion detection system of the current embodiment.

Referring to FIGS. 8A to 8D, although motion is effectively detected in FIG. 8B, the ringing effect is generated under dark lighting. Also, although motion may not be detected under bright lighting as shown in FIG. 8C, motion is effectively detected in FIG. 8D, in which information according to the motion detection system according to the current embodiment is used as advanced information.

FIGS. 9A to 9D illustrate respective results of detecting a motion at an automatic exposure value according to a related art and according to an exemplary embodiment.

Like FIGS. 8A to 8D, with respect to input images of FIG. 9A, FIGS. 9B and 9C show results of motion detection using the related art motion detection methods, and FIG. 9D shows improved performance of a motion detection method by using the motion detection method according to the current embodiment.

FIGS. 10A to 10D illustrate results of graph-cut of images from which motion is detected using a motion detection system according to an exemplary embodiment.

Referring to FIG. 10A to 10D, with regard to input images of FIGS. 10A and 10C, only motion areas of the input images may be accurately obtained at a fast calculation speed as illustrated in FIGS. 10B and 10D, respectively.

Figure 11:
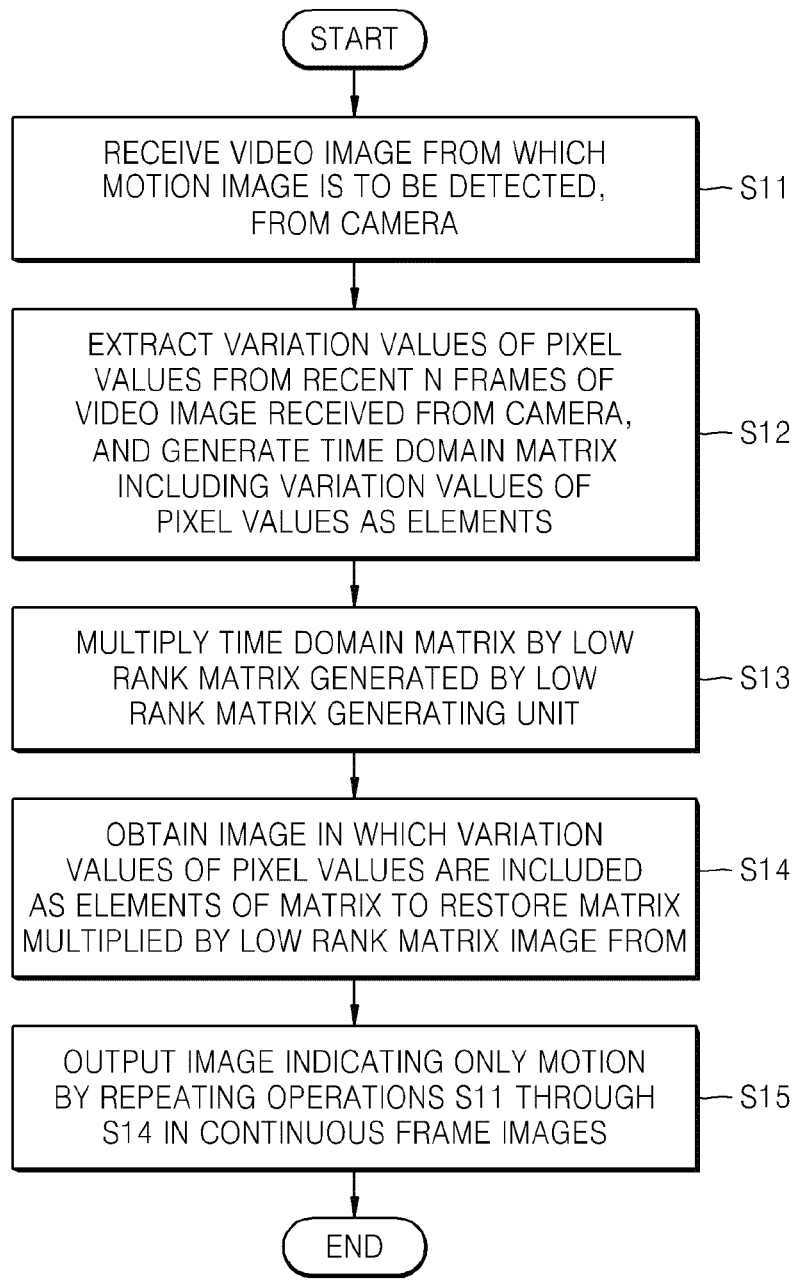
FIG. 11 is a flowchart illustrating a method of detecting a motion using a low rank matrix in reference to FIGS. 1 and 4, according to an exemplary embodiment.

FIG. 11 is a flowchart illustrating a method of detecting a motion using a low rank matrix in reference to FIGS. 1 and 4, according to an exemplary embodiment.

Referring to FIG. 11, first, a video image from which a motion image is to be detected is received from the camera 10 in operation S11.

Next, the image-matrix transforming unit 30 extracts a variation in each of pixel values from recent N frame images of the video image obtained from the camera 10, and generates a time domain matrix that includes the extracted variation in the pixel values as elements, in operation S12.

Next, in operation S13, the low rank matrix applying unit 40 multiplies the time domain matrix by a low rank matrix generated by the low rank matrix generating unit to generate a motion matrix.

Next, in operation S14, to restore an image from the time domain matrix that is multiplied by the low rank matrix, the motion image obtaining unit 50 obtains an image including variation in the pixel values as elements of the motion matrix.

Finally, in operation S15, the motion image obtaining unit 50 applies operations S11 through S14 repeatedly to continuous frame images to output an image indicating only a motion.

FIG. 12 is a flowchart illustrating a method of generating a low rank matrix in reference to FIG. 4, according to an exemplary embodiment.

Referring to FIG. 12, first, in operation S21, the frequency domain transforming unit 110 generates a frequency domain transform matrix for transforming a matrix of a time domain into a matrix of a frequency domain. According to an exemplary embodiment, the frequency domain transform matrix may be a discrete cosine transform matrix $D_N$.

Next, in operation S22, the filtering unit 120 generates a filtering matrix in which a rank size is a bandwidth $\Delta w$ and which filters out low frequency areas.

Next, in operation S23, the time domain transforming unit 130 generates a time domain transform matrix that restores a matrix of a time domain from a matrix of a frequency domain. According to an exemplary embodiment, a time domain transform matrix may be an inverse discrete cosine transform matrix $D_N^T$.

Finally, in operation S24, the low rank matrix generating unit 100 generates a low rank matrix by multiplying a frequency domain transform matrix, a filtering matrix, and a time domain transform matrix. As described above, the low rank matrix may be applied to all pixels.

According to the above exemplary embodiments, a fast and accurate method of detecting a motion may be provided by multiplying a matrix of a time domain representing a variation in each of pixel values of an image by a matrix that is capable of performing frequency domain transform, filtering, and time domain transform in a single operation to thereby detect a motion based on matrix calculation with respect to all pixels of all positions of the image.

Also, according to the above exemplary embodiments, in matrix calculation for motion detection, centro-symmetry is used to calculate repeated calculations by grouping them and a fixed point is used to thereby reduce calculation complexity.

While this inventive concept has been particularly shown and described with reference to exemplary embodiments thereof, it will be understood by those of ordinary skill in the art that various changes in form and details may be made therein without departing from the spirit and scope of the inventive concept as defined by the appended claims. The exemplary embodiments should be considered in descriptive sense only and not for purposes of limitation. Therefore, the scope of the inventive concept is defined not by the detailed description of the exemplary embodiments but by the appended claims, and all differences within the scope will be construed as being included in the inventive concept.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A method of detecting motion, the method comprising:
   generating a time domain matrix comprising vectors corresponding to variation of pixel values as elements of the time domain matrix, of a video image comprising a plurality of frames;
   generating a motion matrix from which a low frequency area of the video image is removed by multiplying the time domain matrix by a low rank matrix; and
   generating a result image comprising a plurality of frames in which vectors, which are elements of the motion matrix, are included as variation of motion pixel values.

2. The method of claim 1, wherein after transforming the time domain matrix into a frequency domain, the low rank matrix filters the low frequency area, and restores a time domain image from the frequency domain matrix, and
   wherein the low rank matrix is a matrix that is calculated in advance before the video image is obtained from a camera.

3. The method of claim 1, wherein the low rank matrix has centro-symmetry.

4. The method of claim 1, wherein the elements of the low rank matrix comprise only fixed points.

5. A motion detection system comprising:
   a camera; and
   an image preprocessor which transforms input image data, provided from the camera, from an analog signal into a digital signal;
   the motion detection system configured to:
   generate a time domain matrix comprising vectors corresponding to variation in pixel values as elements of the time domain matrix, of a video image, provided from the camera, comprising a plurality of frames;
   generate a motion matrix from which a low frequency area of the video image is removed, by multiplying the time domain matrix by a low rank matrix;
   generate a result image comprising a plurality of frames in which vectors, which are elements of the motion matrix, are included as variation of motion pixel values.

6. The motion detection system of claim 5, wherein after transforming the time domain matrix into a frequency domain, the low rank matrix filters the low frequency area, and restores a time domain image from the frequency domain matrix, and
   wherein the low rank matrix is a matrix that is calculated in advance before the video image is obtained from a camera.

7. The motion detection system of claim 5, wherein the low rank matrix has centro-symmetry.

8. The motion detection system of claim 5, wherein the elements of the low rank matrix comprise only fixed points.

9. A method of detecting motion, the method comprising:
generating a frequency domain transforming matrix which transforms a time domain matrix into a frequency domain matrix;
generating a filtering matrix which filters a low frequency component of a video image;
generating a time domain transform matrix which transforms the frequency domain matrix into a time domain matrix; and
generating a low rank matrix by multiplying the frequency domain transform matrix, the filtering matrix, and the time domain transform matrix; and
multiplying the low rank matrix by a time domain matrix comprising vectors regarding variation of pixel values of an input video image as elements of the time domain matrix.

10. The method of claim 9, wherein a rank of the frequency domain transform matrix corresponds to a number of frames of the input video image from which the variation of the pixel values are extracted.

11. The method of claim 9, wherein the low rank matrix L is expressed as $L=D_N^T \cdot E_{M,N} \cdot D_N$ by using the frequency domain transform matrix $D_N$, the filtering matrix $E_{M,N}$, and the time domain transform matrix $D_N^T$,
where N denotes a number of frames of the input video image from which the variation of the pixel values are extracted, and M denotes a bandwidth of the filtering matrix.

12. The method of claim 9, wherein a rank of the low rank matrix is a value obtained by subtracting a rank of the filtering matrix from a rank of the frequency domain transform matrix.

13. The method of claim 9, wherein the low rank matrix L has centro-symmetry.

14. The method of claim 9, wherein the elements of the low rank matrix comprise only fixed points.

15. The method of claim 9, wherein the frequency domain transform matrix uses a discrete cosine transform method.

16. The method of claim 9, wherein the filtering matrix $E_{M,N}$ is expressed as $$E_{M,N} = \text{diag}(\underbrace{\underbrace{0, \cdots, 0}_{M}, \underbrace{1, \cdots, 1}_{N-M}}_{N}) \text{ (where } M < N\text{),}$$

where M is a bandwidth of the filtering matrix, and N is a number of frames of the input video image from which the variation of the pixel values are extracted.

17. A motion detection system, comprising:
a camera; and
an image preprocessor which transforms input image data, provided from the camera, from an analog signal into a digital signal;
the motion detection system configured to:
generate a frequency domain transform matrix transforming a time domain matrix into a frequency domain matrix;
generate a filtering matrix filtering a low frequency component of a video image;
generate a time domain transform matrix transforming the frequency domain matrix into a time domain matrix;
generate a low rank matrix by multiplying the frequency domain transform matrix, the filtering matrix, and the time domain transform matrix; and
multiply the low rank matrix by a time domain matrix comprising vectors with respect to variation of pixel values of an input video image as elements of the time domain matrix.

18. The motion detection system of claim 17, wherein a rank of the frequency domain transform matrix corresponds to a number of frames of the input video image from which variation of the pixel values are extracted.

19. The motion detection system of claim 17, wherein the low rank matrix L is expressed as $L=D_N^T \cdot E_{M,N} \cdot D_N$ by using the frequency domain transform matrix $D_N$, the filtering matrix $E_{M,N}$, and the time domain transform matrix $D_N^T$,
where N denotes a number of frames of the input video image from which the variation of the pixel values are extracted, and M denotes a bandwidth of the filtering matrix.

20. The motion detection system of claim 17, wherein a rank of the low rank matrix is a value obtained by subtracting a rank of the filtering matrix from a rank of the frequency domain transform matrix.

21. The motion detection system of claim 17, wherein the low rank matrix L has centro-symmetry.

22. The motion detection system of claim 17, wherein the elements of the low rank matrix comprise only fixed points.

23. The motion detection system of claim 17, wherein the frequency domain transform matrix uses a discrete cosine transform method.

24. The motion detection system of claim 17, wherein the filtering matrix $E_{M,N}$ is expressed as $$E_{M,N} = \text{diag}(\underbrace{\underbrace{0, \cdots, 0}_{M}, \underbrace{1, \cdots, 1}_{N-M}}_{N}) \text{ (where } M < N\text{),}$$

where M is a bandwidth of the filtering matrix, and N is a number of frames of the input video image from which the variation of the pixel values are extracted.

* * * * *